March 4, 1969 K. R. EVANS 3,431,453

ELECTRON TUBE VARIABLE DELAY LINE

Original Filed July 16, 1965 Sheet 1 of 5

INVENTOR
KENNETH R. EVANS
BY, Alfred H. Rosen
Thomas N. Tarrant
ATTORNEYS

INVENTOR
KENNETH R. EVANS
BY, [signature]
ATTORNEYS

INVENTOR
KENNETH R. EVANS
BY, Alfred H. Rosen
Thomas N. Tarrant
ATTORNEYS

United States Patent Office 3,431,453

Patented Mar. 4, 1969

3,431,453

ELECTRON TUBE VARIABLE DELAY LINE

Kenneth R. Evans, Concord, Mass., assignor to Microwave Associates, Incorporated, Burlington, Mass., a corporation of Massachusetts Continuation of application Ser. No. 472,567, July 16, 1965. This application Nov. 20, 1967, Ser. No. 684,560
U.S. Cl. 315—3.6 11 Claims
Int. Cl. H01j 25/34

ABSTRACT OF THE DISCLOSURE

An O-type traveling wave tube delay line in which the focusing magnetic field is different in the drift region between input and output couplers and the beam velocity is electrostatically variable in the drift region.

This application is a continuation of application Ser. No. 472,567, now abandoned.

An O-type traveling wave tube delay line is disclosed, employing a space-charge wave in a drift tube the potential applied to which controls the delay. The magnetic field may be varied in the drift tube for beam focusing.

This application relates to microwave delay lines and particularly to the use of traveling wave tubes as voltage variable delay lines.

Microwave delay lines are useful in many applications in the laboratory and in electronic systems. Two of the most important system applications are; the control of phase in the receiver portion of a phased array system, and the delay of a received signal in an electronic countermeasures system. A useful microwave delay line to meet both of these applications would have at least these minimum characteristics. (1) A bandwidth of at least 1 octave with the delay not dependent upon frequency. (2) A zero db insertion loss over an octave band. A moderate net gain would be a desirable feature. (3) A low noise figure so as not to contribute to the overall system noise. (4) A time delay from a few nanoseconds up into the hundreds of nanoseconds or into the microsecond range. This delay must be electronically variable, preferably at a rapid rate and resettable with high precision. (5) Amplitude and frequency linearity. There should be no amplitude or phase distortion of the input signal after passing through the delay device. (6) A minimum size and weight if the device is to be an improvement over existing approaches.

There are several classes of time delay devices which meet some of the above requirements.

Acoustic wave devices have been the subject of recent work in several laboratories. These devices are most suitable for long time fixed delay applications. Their disadvantage at present is that there are large losses in launching and extracting the wave from the low velocity material through transducers.

Ferrite type devices have shown some promise. There are classes of wave propagation in ferrite type materials at low velocities which can be utilized to obtain variable slow wave propagation. Unfortunately, such propagation modes are critically dependent on the magnetic field and exhibit large dispersion and narrow bandwidth. High losses again are involved in launching and extracting the waves from the material.

Activity in the vacuum tube approach is continuing with two main contenders for the job. In one approach, a fixed delay line and a high gain traveling-wave tube are placed in a feedback loop circuit. The signal to be delayed makes many passes through the fixed delay line and is re-amplified at each pass through the traveling-wave tube. Digital delays, in steps, dependent upon the fixed delay value, are available from this method up into the microsecond range. This system is bulky and because of the feedback path, can act as a microwave interferometer at discrete frequencies to the following pulses in a continuous pulse train.

In the second and more promising approach, an electron beam with the signal information imposed, is allowed to drift at very low velocities to achieve the required delay. In a conventional traveling wave tube, it is important that the accelerating potential be relatively high compared with thermal noise so that the deviations in electron potentials due to thermal noise do not become a significant factor. Thus delay by reduced accelerating potential is not an easy answer in conventional tubes. One approach to preserve the signal information over long drift periods is crossed field focusing with the beam modulated in the fast cyclotron wave mode. Recent reports have shown that this approach can yield up to three microseconds of delay. High insertion loss and distortion of the delayed signal are still problems. Bandwidths are limited to between 15 and 25% because of the method of fast mode coupling. An example of this second approach is U.S. Patent 3,153,742 to Klüver.

In accordance with the present invention an electron tube delay device has been developed which operates on a different principle to achieve the ends disclosed in the Klüver patent.

This novel tube operates over a wide bandwidth with little distortion and insertion loss. Fundamentally, it is an O-type traveling-wave tube utilizing a length of drift tube in which the beam electrons are caused to drift at a low forward velocity to achieve the delay. A further feature of this novel tube is the practical conversion of slow-wave signal modulation on the beam to synchronous wave modulation as the beam enters the drift region, and the partial reconversion to slow-wave modulation upon leaving the drift region. In this way a portion of the intelligence can be placed in the radii of rotation, and then the overall beam velocity can be reduced to a very large extent inside the drift tube without swamping the intelligence with thermal noise, thus allowing longer delays. The transformation or retransformation to or from synchronous mode propagation can be further enhanced by an increase or decrease of magnetic field strength at the drift region, or even a reversal thereof. Thus, it is an object of the present invention to provide a variable delay traveling wave tube, and more particularly to provide a traveling wave tube in which slow wave signal modulation on the electron beam is transformed into synchronous wave propagation of the signal on the beam in the drift region in the tube.

It is a further object of the invention to provide an electron tube delay line in which the delay is introduced in a drift region having a magnetic field which can be altered in strength relative to the magnetic fields at either end of the drift region.

The invention will now be described with reference to exemplary embodiments. The description of these embodiments refers to the drawings in which.

Figures 1, 1A:
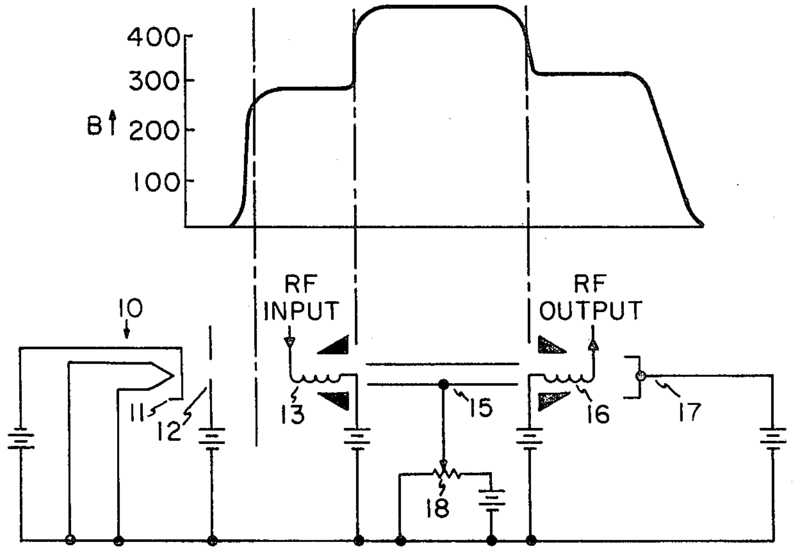
FIG. 1 is a schematic illustration of a traveling wave tube.
FIG. 1A is a graphical representation of magnetic field strength related to sections of the tube of FIG. 1.

Referring to FIG. 1, electron gun 10 is depicted by cathode structure 11 and grid structure 12. The electron gun is followed by a first helix slow wave structure 13, a drift tube 15, a second helix slow wave structure 16, and a collector 17.

FIG. 1A is a graph showing magnetic flux density along the axis of the traveling wave tube of FIG. 1.

As is well known, a signal in a slow-wave mode on a slowly-drifting electron beam is highly susceptible of attenuation due to the relatively large ratio of thermal velocity to axial velocity of the drifting beam. In the present invention the beam is modulated by interaction with the incoming signal while the axial velocity is still high. Then the signal information is transformed to a different propagation mode in which the thermal velocity has less effect.

Reverting now to FIG. 1, an electron beam is projected from electron gun 10 with an acceleration determined first by the potential on grid or grids 12 and then by the potential on helix slow wave coupler 13. Neither the form of the gun 10 nor the coupler 13 is critical. Any input coupler suitable for modulating the beam with longitudinal waves (velocity modulation) may be used. A moderate longitudinal magnetic field as indicated in FIG. 1A maintains the beam in focus until it has passed through coupler 13. At the exit of coupler 13, a sharp increase in longitudinal magnetic field occurs as indicated in FIG. 1A. The sharp increase in magnetic field deflects the electrons by an amount proportional to their velocity. The input helix 13, drift tube 15, output helix 16 and collector 17 follow sequentially in line with the electron gun. A potentiometer 18 in series with a battery provides variable delay potential to the drift tube 15. Thus in FIG. 1 it is possible to provide, along with this variable delay potential, a change in magnetic field in the region of the drift tube.

While the following is not intended to be limiting, it is believed to explain the operation of the embodiment of FIG. 1.

An electron traveling parallel to lines of magnetic flux will remain parallel to a flux line and hence is prevented from diverging from its original path of travel. A sharp change in magnetic field is seen as a sharp bend in the line of flux. This applies a force normal to the path of travel. Some of the forward velocity of the electron becomes converted to velocity at right angles to the path of travel. However, the longitudinal flux lines are still there preventing spreading of the electrons. The result is that the velocity at right angles is immediately converted to a rotational velocity around a magnetic flux line at a fixed cyclotron frequency. Thus, some velocity information of each electron is imparted to an orbital radius.

Consider a simplified conservation of energy equation valid prior to entrance to drift tube 15:

$$\frac{mv^2_{z_1}}{2}=\frac{mv^2_{z_2}}{2}+\frac{m\dot{\theta}^2r^2}{2} \qquad \text{(Equation 1)}$$

where:

$m$=mass of the electron $v_{z_1}$=velocity of an electron before the increase in magnetic field $v_{z_2}$=velocity of an electron after the increase in magnetic field $r$=radius of spin of electron $$\dot{\theta}\approx-\frac{e\Delta B}{2m}=\text{the Larmor precession frequency} \qquad \text{(Equation 2)}$$

Equation 2 defines $\dot{\theta}$ as the Larmor precession frequency $\omega L$. In this case, the value of $\Delta B$ can be approximated by the difference between the two magnetic field values, which means that $\dot{\theta}$ is fixed and invariant. Since only that component of the axial velocity of an electron which is perpendicular to the magnetic field lines is transformed into radial motion, $v_{z_1}$ will be proportional to $v_{z_2}$ for any values of $v$, and thus is dependent only on the angle of crossing, not on the absolute values. Thus, the ratio of $v_{z_1}$ to $v_{z_2}$ is a constant since the geometry is invariant. Hence, if there is an increase or decrease in the velocity $v_{z_1}$ as by slow wave modulation on the beam, the change in axial velocity $v_{z_2}$ will be proportional but not equal. To preserve the conservation of energy, the last term in Equation 1 must also increase or decrease in proportion to $v_{z_1}$. With fixed magnetic fields, the variable in the last term must be the radius of rotation. Thus, the radius is directly proportional to the input velocity.

Figure 2:
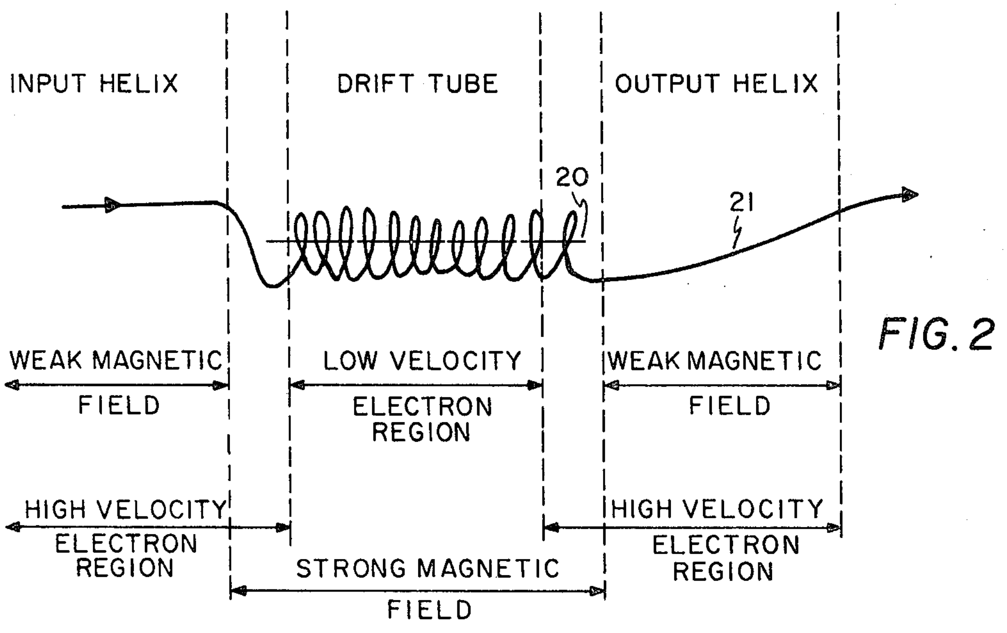
FIG. 2 shows the path of an electron in the tube of FIG. 1.

The path of a typical single electron is shown in FIG. 2.

Strong electric lenses are formed between input and output helix and the drift tube. For major differences in potential, a very strong convergent lens action occurs between the input helix and the drift tube. The high magnetic field in this region, however, prevents the beam from collapsing. The net effect of this lens in the presence of the magnetic field is to cause a scalloping on the beam within the drift tube. At the exit or collector end of the drift tube, another convergent lens of opposite polarity is present. This is a much weaker lens than the input lens and, because the electrons at this lens are still within the strong magnetic field region, the effect on electronic paths is not important. Because of the scalloping, however, the output magnetic lens will not retransform all the radial information to axial velocity information and some loss of signal will occur. A magnetic flux line is represented in FIG. 2 by line 20. A typical single electron follows a path 21 as illustrated rotating around flux line 20. Because the transition is not balance for all drift velocities due to the action of the input lens, the electron re-emerges from the drift tube with some net radial energy. The losses in passing through this device can be made up, by re-amplifying the output signal in the output helix region, just as in an ordinary traveling-wave tube.

It is interesting to examine the required drift potentials if we wish this device to delay signals up into the microsecond range, As an example, if we wish to delay an RF signal three microseconds in a drift tube three inches in length, it would require a drift potential of approximately two millivolts. This, however, would not be be the potential applied to the drift tube because we cannot neglect the effects of space charge potential depression in the slowly drifting beam. However, the presence of space-charge in the beam will cause part of the beam, at least, to reach low values of axial velocity. The applied drift tube potential for any given delay can be determined experimentally as a function of current density. This effect will be shown in connection with the experimental data discussed later.

EXAMPLE

A delay line was derived from a c-band, radio-relay type traveling-wave tube. It normally has a beam current of 40 ma. at a beam potential of 2500 volts. It contains a magnetically shielded convergent flow electron gun.

This tube was modified by replacing the center three inches of helix with a drift tube of the same diameter. The remaining helix formed the input and output couplers for this device.

The normal PPM focusing structure was replaced with a three section electromagnet independently adjustable over wide ranges of magnetic field.

The delay line was operated at a beam current of 1.5 to 2.0 ma. in all of the experiments. Beam potential within the helix couplers was 2100 volts. Except for bandwidth experiments, the input RF pulse was at a frequency of 5.5 kmc. and was derived from the chopped output of a CW source.

Figure 3:
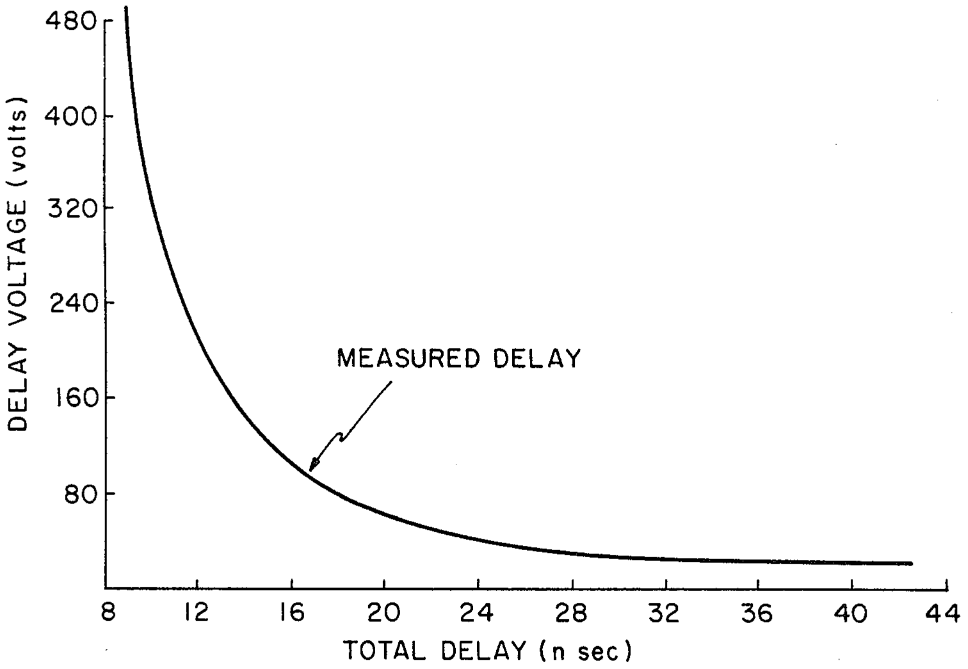
FIG. 3 is a graph of signal delay vs. delay potential.

FIG. 3 shows delay versus applied drift potential.

Figure 4:
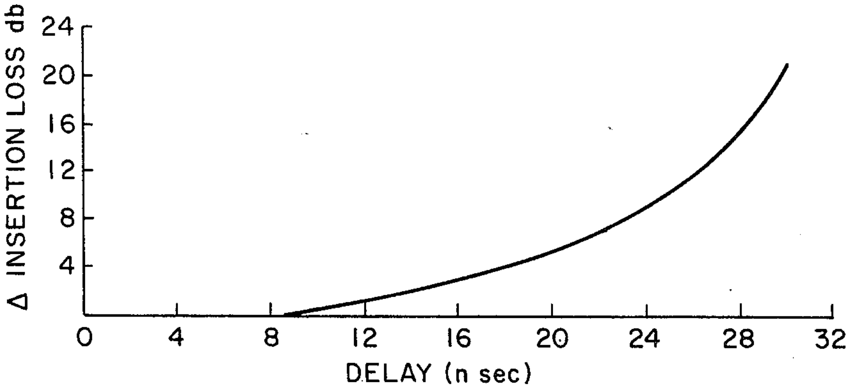
FIG. 4 is a graph of insertion loss vs. delay.

FIG. 4 shows the insertion loss as a function of the delay. The loss at high values of delay is due to high intercepted currents in the drift tube, allowing little or no beam to pass through the output coupler.

Delay as a function of frequency was invariant with the limits of experimental error over a bandwidth exceeding 25%.

Figure 5:
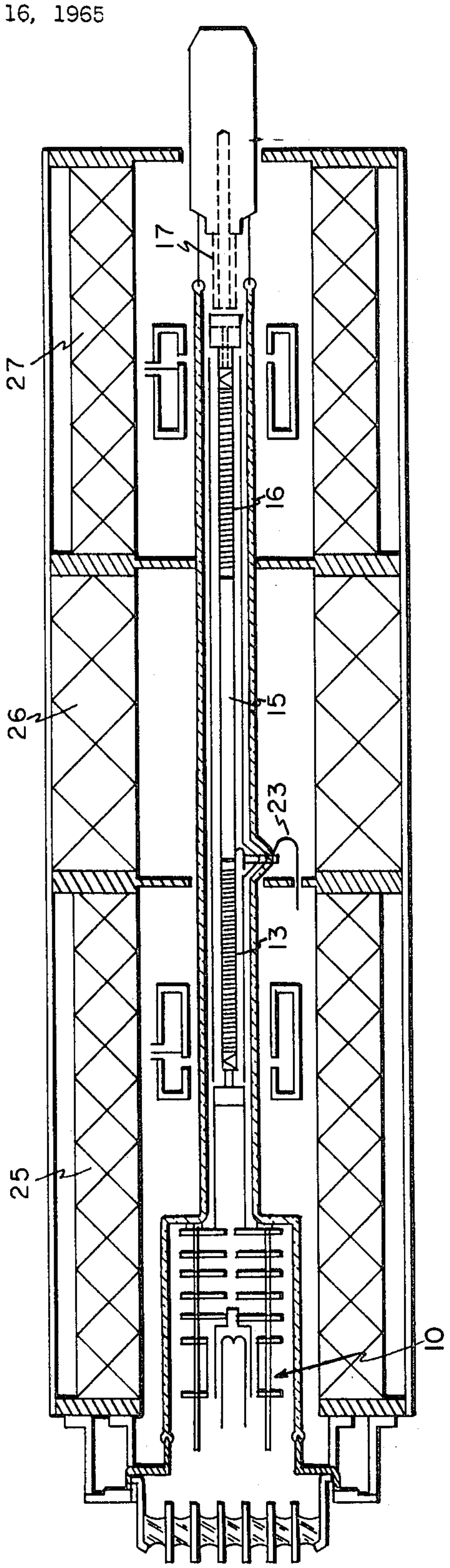
FIG. 5 is a cross-sectional view of an Electron Tube Delay line in accordance with the invention.

FIG. 5 is a cross-section of a delay line in which part of the detail not relevent to the invention has been omitted. The internal elements of the tube are designated as in FIG. 1 with the electron gun generally designated 10. The input helix 13, drift tube 15, output helix 16 and collector 17 follow sequentially in line with the electron gun. Wire 23 is a connecting wire for applying the variable delay potential to drift tube 15. Magnet 25 and magnet 27 apply the longitudinal fields at the input and output sections of the tube while magnet 26 applies a relatively stronger longitudinal magnetic field in the region of drift tube 15.

While the invention has been described in relation to a specific embodiment, various modifications thereof will be apparent to those skilled in the art and it is intended to cover the invention broadly within the spirit and scope of the appended claims.

I claim:

1. An O-type traveling wave tube delay line with means to provide an electron beam propagating in a prescribed path and along said path signal input and signal output coupling regions and an intervening drift region, means to provide an axial magnetic focusing field in which the field strength is different in the drift region than in at least one of the coupling regions, and thereby changes a wave propagating on said beam from one form in said coupling region to another form in the drift region, and variable electrostatic potential means to alter the electron beam velocity in the drift region.

2. A delay line according to claim 1 in which the change in magnetic field strength between said at least one coupling region and the drift region is abrupt.

3. A delay line according to claim 1 in which the magnetic focusing field remains constant within the drift region while the delay is variable by controlling the electrostatic potential of the drift region.

4. A delay line according to claim 1 in which the magnetic field strength is greater in the drift region than in said at least one coupling region such that said wave propagates in a synchronous mode in said drift region.

5. A delay line according to claim 1 including a magnet assembly providing a substantial change in longitudinal flux density between said drift region and at least one of said input and output regions, and means to vary the accelerating potential over said drift region for controlling the delay time of said tube.

6. A delay line according to claim 5 in which said flux density is greater in the drift region than in both of said input and output regions such that said wave propagates in a slow wave space charge mode in said input and output regions, and in a synchronous mode in the drift region.

7. A delay line according to claim 6 including a magnet assembly providing a substantial increase in longitudinal flux density going from said input coupling region to said drift region and a substantial decrease in longitudinal flux density going from said drift region to said output coupling region.

8. A delay line according to claim 1 comprising:
(a) an electron gun for projecting an electron beam;
(b) a slow wave structure for interacting a pulsed RF signal with said beam;
(c) a first mode-transformer comprising a transition from low to high longitudinal magnetic field for transforming a slow wave space-charge mode propagating on said beam into a wave propagating in a synchronous mode;
(d) a drift tube providing a drift region inside said high longitudinal magnetic field;
(e) means to apply a variable accelerating potential on said drift tube for controlling drift time and thereby controlling the delay time of said delay line;
(f) a second mode-transformer comprising a transition from high to low longitudinal magnetic field for transforming said synchronous mode back to a slow wave space-charge mode;
(g) a slow wave structure for removing the delayed signal from said beam; and
(h) a collector electrode for terminating said beam.

9. A delay line according to claim 1 comprising:
(a) an emitter electrode;
(b) a collector electrode;
(c) in sequence between said emitter and said collector
 (1) a slow wave input signal structure,
 (2) a length of drift tunnel, and
 (3) a slow wave output signal structure;
(d) means to apply a longitudinal magnetic field along said tube which is stepped sharply to a substantially greater magnitude in the region of said drift tunnel than in the region of said input and output signal structures; and
(e) means to vary the potential of said drift tunnel with respect to said emitter electrode whereby to reduce the acceleration of electrons entering said drift tunnel and thereby to control the delay time of said delay line.

10. A delay line according to claim 1 comprising:
(a) an electron gun for projecting an electron beam;
(b) a first coupling structure for velocity modulating said beam with a signal;
(c) a transmission section for propagating said beam as modulated;
(d) a second coupling structure for demodulating said beam;
(e) a collector electrode for terminating said beam;
(f) a first magnet applying a longitudinal focusing field extending over said gun and said first coupling structure;
(g) a second magnet applying a longitudinal field of substantially greater magnitude extending over said section and providing sharp slopes of magnitude change at the input and output regions of said section whereby a portion of the velocity information in said beam is transformed to tangential velocity of electrons travelling through said section;
(h) a third magnet applying a longitudinal field extending over said second coupling structure; and
(i) means to apply a variable potential to said section with respect to the potentials of said electron gun so as to vary the velocity of said beam in said section for controlling the delay time of said tube.

11. A method of introducing a variable delay in an RF signal comprising in sequence:
(a) forming an electron beam;
(b) focusing said beam with a longitudinal magnetic field;
(c) velocity modulating said beam by synchronously interacting said RF signal with said beam;
(d) sharply altering said magnetic field in one direction to convert from space-charge to synchronous waves whereby the cyclotron spin of the electrons in said beam changes in orbital radius in proportion to the velocity of each individual electron;

(e) modifying the accelerating potential on said beam in accordance with a selected delay;

(f) transmitting said beam over a path in which said accelerating potential remains constant at the modified level providing a delay interval;

(g) sharply altering said magnetic field in the reverse direction to convert from synchronous to space-charge waves whereby the cyclotron spin of the electrons in said beam reverts to substantially the original orbital radius of the individual electron and said electrons assume velocities proportional to their spin radii; and (h) demodulating said beam so as to extract said RF signal as delayed.

References Cited

UNITED STATES PATENTS

| | | | |
|---|---|---|---|
| 2,811,664 | 10/1957 | Kazan | 315—3.6 |
| 2,933,639 | 4/1960 | Lally | 315—3.6 |
| 3,122,710 | 2/1964 | Miller | 315—3 X |
| 3,179,838 | 4/1965 | Adler | 315—3 |
| 3,218,503 | 11/1965 | Adler | 315—3 |
| 3,314,016 | 4/1967 | Payne | 328—233 |
| 3,337,765 | 8/1967 | Chapell | 315—3.6 |
| 3,341,733 | 9/1967 | Kantorowicz | 315—3.6 |

ELI LIEBERMAN, *Primary Examiner.*

SAXFIELD CHATMON, Jr., *Assistant Examiner.*

U.S. Cl. X.R.

315—393